United States Patent Office 3,242,154
Patented Mar. 22, 1966

3,242,154
CURING CHLOROPRENE USING AMORPHOUS ADSORBENTS
Francis M. O'Connor, Kenmore, and Tudor L. Thomas, Jr., Snyder, N.Y., assignors to Union Carbide Corporation, a corporation of New York
No Drawing. Filed Apr. 20, 1960, Ser. No. 23,357
18 Claims. (Cl. 260—92.3)

This invention relates to curing accelerators for neoprene rubber formulations. More particularly, this invention relates to an efficient and readily controlled method of using powerful curing accelerators in neoprene rubber formulations.

Neoprene is the generic term for the synthetic elastomers based on the polymers of chloroprene, that is, 2-chlorobutadiene-1,3. Two particularly important classes of polychloroprene polymers are designated Type G neoprenes and Type W neoprenes. Type G neoprenes are sulfur-modified chloroprene-based synthetic elastomers and Type W neoprenes are stabilized non-sulfur-modified chloroprene-based synthetic elastomers. While the basic physical properties of cured neoprene are similar to those of natural and styrene-butadiene rubber the former surpasses the latter in certain other properties. For example, neoprene vulcanizates exhibit improved resistance to deterioration by oils, solvents, oxidation, sunlight, flexing, heat and by flame.

The cross-linking mechanism in neoprene vulcanization or curing is different from that in styrene-butadiene and natural rubber. Metallic oxides such as zinc oxide and magnesium oxide are the most widely used vulcanizing agents for neoprene rubber formulations. The exact mechanism of the cross-linking reaction in neoprene, however, is not completely understood.

Many types of neoprenes are available. For compounding purposes, the general purpose neoprene formulations fall into two groupings: sulfur-modified and non-sulfur-modified. The sulfur-modified neoprenes, typified by Type GN, require only metallic oxides for vulcanization. In contrast to this, neoprene Types W, WHV and WRT, the non-sulfur-modified types, are dependent not only on metallic oxides but also on curing accelerators to develop acceptable curing characteristics and vulcanizate properties. In processing neoprene as well as other rubber compounds, the primary function of the accelerator is to increase the rate of curing. Accelerators can also affect the physical properties of the vulcanizate and in general, the tendency is toward an improvement in and uniformity of such properties.

Neoprene, like many other rubbers, is processed at elevated temperatures. During this processing, premature vulcanization or "scorch" is a serious problem. Ideally, the curing accelerator should not become active during the various stages of processing such as milling, extruding, molding and the like; that is, a long scorch time is desirable. However, at the same time, the curing accelerator should be available upon demand to bring about a rapid vulcanization, that is, a short cure time.

The prior art curing accelerators such as the diortho-tolylguanidine salt of dicatechol borate or the resonance hybrid of 2-mercaptomidazoline and ethylene thiourea give a moderate increase in the cure rate of non-sulfur-modified neoprenes, but this is accompanied by an undesirable decrease in the scorch time. Generally, those curing accelerators which have very high activity have poor processability, that is, a short time, while those which have good processability are not very active. The prior art is therefore faced with choosing an accelerator which has intermediate properties. The most efficient accelerators, such as pyracatechol (catechol, 1,2-benzenediol) and diethylthiourea, are seldom used in the prior art because their very short scorch time makes processing difficult.

It is the principal object of this invention to provide a method for utilizing powerful accelerators to obtain rapid rates of cure in non-sulfur-modified neoprene rubber formulations without a concomitant undesirable decrease in scorch time.

It is a further object of this invention to provide a method for varying the scorch time and rate of cure for a particular neoprene rubber formulation thus introducing a desirable flexibility into the processing conditions for the neoprene rubber formulation.

This invention is based upon the discovery that an amorphous adsorbent may be used to introduce pyrocatechol and other powerful accelerators into a neoprene rubber formulation in a sorbed state, whereby these accelerators are withheld from the formulation during the early stages of processing thus preventing premature curing or a short scorch time for the formulation. When it is desired to cure or vulcanize the formulation, the accelerator can be released from the adsorbent in at least one active form by the application of heat or by displacement with a more strongly held material. An increase in the rate of cure can thus be obtained without an undesirable decrease in the scorch time. The possible active forms of the released accelerator include accelerator molecules, free radicals and ions derived from the molecules. The exact nature of the released accelerator is not known.

In preparing the accelerator compositions the amorphous adsorbent is activated at its recommended temperature for a suitable period of time. The activation step comprises the driving off of at least a portion of the water present in the adsorbent. In the absence of water the channels or pores remaining in the carrier will accept at least a portion of the accelerator molecule into the sorption area. In some instances the pore size of the amorphous adsorbent relative to the size and shape of the accelerator molecule is such that substantially all of the accelerator molecule is believed to be internally sorbed within the structure, thus providing a more isolated accelerator for systems in which a maximum scorch time increase is desired. In either instance, however, it is the combination of the accelerator compound with the sorptive forces of the amorphous adsorbent which provides the temperature sensitive latent accelerator of this invention. Also, the adsorbents useful in the practice of this invention preferably should have a relatively large surface area, that is, at least 150 square meters per gram.

Silica gel, activated carbon, activated alumina, and amorphous metal aluminosilicates are known to be porous-type amorphous adsorbents with internal surface sorption areas. Clays are also known to have internal surface area available for sorption but some clays are not useful for this invention because their pores are not large enough to admit the types of compounds useful as curing accelerators.

Table I lists the properties of the specific porous amorphous adsorbents used in determining the effects of curing accelerators sorbed on amorphous adsorbents. The most frequently occurring pore diameter was determined for samples of silica gel, activated alumina, and activated carbon in order to show that compounds used as accelerators can be sorbed on these materials. This data was obtained experimentally using the hysteresis loop in the adsorption-desorption isotherms of nitrogen gas at a temperature of $+77°$ K. The pore radii were calculated using the Kelvin equation as given in S. Brunauer "The Adsorption of Gases and Vapors," vol. 1, pages 394–404, Princeton University Press (1954).

Pore size distribution curves for silica gel, activated carbon and activated alumina were obtained by plotting the differentiated structure curve for these materials. The shape of such a curve for a given adsorbent resembles the Gauss error curve and implies that the pores are distributed according to the laws of probability. The peak of the curve corresponds to the point of inflection in the desorption branch of the adsorption-desorption isotherm. Thus, the capillary diameter corresponding to the point of inflection is the most frequently occurring diameter in the adsorbent.

*Table I*

PROPERTIES OF AMORPHOUS ADSORBENTS

| Adsorbent | Surface Area, m.$^2$/g. | Pore Diameter of Most Common Pore, Å. |
|---|---|---|
| Silica Gel | 680 | 20 |
| Activated Carbon | 1,040 | 28 |
| Activated Alumina | 220 | 18 |
| Amorphous Metal Aluminosilicate [a] | ~70–150 | Not available |

[a] Zeolex-20 sold by the J. M. Huber Corporation.

Each of the adsorbents used to carry the active agent (accelerator) should, before the sorption step, be activated at its recommended temperature for a suitable period of time. As an example, for the silica gel referred to above, heating at 200° C. in a circulating air oven for 4 hours is suitable treatment.

The temperature at which an accelerator is released from an amorphous adsorbent is a function of its volatility and how tightly it is held by the adsorbent. Therefore, low boiling accelerators will be released at relatively low temperatures and will be useful in formulations which are processed or stored at low temperatures whereas high boiling accelerators will release at relatively high temperatures and will be useful in formulations which are processed at elevated temperatures. A rubber formulator can therefore choose an accelerator-adsorbent combination which best suits the requirements of his system.

Rubber formulations are usually processed at temperatures of 200° F. to 300° F. and, thus, accelerators which are withheld at these temperatures must be used in order to insure safe processing. Vulcanization or curing temperatures for neoprene rubber formulations range from 280° F. to 400° F. Sorbed accelerators must therefore be released in this temperature range in order to be useful for the practice of this invention.

Pyrocatechol [1,2-$C_6H_4(OH)_2$] is a solid that boils at 246° C. and has a density of 1.34 grams/cm.$^3$. Diethylthiourea [1,3-$C_2H_5NHCSNHC_2H_5$] is a solid that melts at 77° C. Another accelerator useful in the present invention is the commercially available thioamide containing compound designated and known as "NA-33." The exact composition of this accelerator is not known but it is believed to contain cyclohexyl thioamide, $C_6H_{11}CSNH_2$.

In one embodiment of this invention, an amorphous adsorbent previously loaded with an accelerator is added to a neoprene rubber formulation. The adsorbent holds the accelerator in the sorbed state during processing of the formulation up to the curing temperature of the formulation, at which point the accelerator is released and the formulation is rapidly cured. In another embodiment of this invention, the previously loaded adsorbent is heated for a predetermined length of time and then added to the rubber formulation to be processed and vulcanized.

One embodiment of the present invention is set forth in the experimental data of Table A, below, wherein the effects of scorch time and rapidity of cure for no accelerator, accelerators without amorphous adsorbents, and accelerators sorbed on amorphous adsorbents are compared. The nature of the neoprene formulation and the details of the experimental methods are discussed immediately following the table.

Table A shows that the neoprene rubber formulation or recipe cured very slowly in the absence of accelerators. When the accelerators were added in the conventional manner, a very rapid cure resulted at the expense of a sharp decrease in scorch time.

Silica gel is seen to be a particularly useful amorphous adsorbent for controlling the activity of the accelerators and is the preferred adsorbent for this invention. Pyrocatechol loaded on amorphous aluminosilicates, on silica gel and on activated alumina gives equally as fast cures as catechol and longer scorch times. Pyrocatechol adsorbed on activated carbon, however, had no effect on either the cure or scorch characteristics of the formulation. This may be due to a reaction occurring between the pyrocatechol and the carbon during adsorption which ties up the pyrocatechol even at vulcanization temperatures.

*Table A*

ACCELERATORS LOADED ON AMORPHOUS ADSORBENTS IN NEOPRENE W FORMULATIONS AS SHOWN IN TABLE II

| Adsorbent | Accelerator | Accelerator in Recipe, p.h.r. | Accelerator Loaded Adsorbent in Recipe, p.h.r.[2] | Recipe (See Table II) | Mooney Scorch Time (Min. to 5 pt. rise) | Stress at 300% Elongation, p.s.i. cure at 307° F. for— | | | Ultimate Tensile, p.s.i. cure at 307° F. for— | | | Ultimate Elongation, percent cure at 307° F. for— | | |
|---|---|---|---|---|---|---|---|---|---|---|---|---|---|---|
| | | | | | | 5 Min. | 7 Min. | 10 Min. | 5 Min. | 7 Min. | 10 Min. | 5 Min. | 7 Min. | 10 Min. |
| None | None | None | None | 1 | 30 | ([3]) | ([3]) | ([3]) | ([3]) | ([3]) | ([3]) | ([3]) | ([3]) | ([3]) |
| None | NA-22 [1] | 0.3 | None | 1 | 8.5 | 965 | 1,112 | 1,263 | 2,773 | 3,130 | 3,105 | 740 | 680 | 590 |
| None | NA-33 | 1.0 | None | 2 | 11 | 1,762 | 1,976 | 2,136 | 3,238 | 3,247 | 3,182 | 510 | 455 | 410 |
| None | Diethylthiourea | 0.5 | None | 2 | 6 | 1,275 | 1,647 | 1,760 | 3,375 | 3,553 | 3,413 | 560 | 525 | 500 |
| None | Pyrocatechol | 0.2 | None | 1 | 5.5 | 1,105 | 1,730 | 1,730 | 2,946 | 3,191 | 3,012 | 875 | 515 | 485 |
| Silica Gel | do | 0.2 | 1.3 | 1 | 11.5 | 948 | 1,645 | 1,760 | 2,667 | 2,980 | 2,800 | 615 | 475 | 435 |
| Activated Carbon | do | 0.2 | 1.3 | 1 | 31 | ([3]) | ([3]) | ([3]) | ([3]) | ([3]) | ([3]) | ([3]) | ([3]) | ([3]) |
| Activated Alumina | do | 0.2 | 1.3 | 1 | 11.5 | 688 | 830 | 1,427 | 1,860 | 2,114 | 2,599 | 635 | 565 | 455 |
| Zeolex-20 | do | 0.2 | 1.3 | 1 | 8.0 | 900 | 1,215 | | 2,750 | 2,886 | | 685 | 600 | |
| Silica Gel | NA-33 | 1.0 | 4.0 | 2 | 20 | 1,013 | 1,531 | 1,900 | 2,835 | 2,759 | 3,250 | 730 | 570 | 470 |
| Activated Carbon | NA-33 | 1.0 | 4.0 | 2 | 10.5 | 1,714 | 2,098 | 2,049 | 2,667 | 2,762 | 2,683 | 440 | 415 | 380 |
| Activated Alumina | NA-33 | 1.0 | 4.0 | 2 | 12 | 1,610 | 1,952 | 2,133 | 2,780 | 2,286 | 2,519 | 450 | 340 | 340 |
| Zeolex-20 | NA-33 | 1.0 | 4.0 | 2 | 14 | 1,882 | 2,000 | 2,120 | 3,200 | 3,238 | 3,084 | 500 | 450 | 430 |
| Silica Gel | Deithylthiourea | 0.5 | 3.3 | 2 | 15.2 | 883 | 1,120 | 1,247 | 2,961 | 3,147 | 3,227 | 740 | 625 | 600 |

[1] Ethylene thiourea.
[2] Parts per hundred parts rubber.
[3] No cure.

It is therefore evident that sorption of accelerators on adsorbents which have pores large enough to allow the accelerator to be sorbed (silica gel, activated alumina and amorphous aluminosilicates) allows control of activity of the acelerator at scorch temperatures without affecting the activity at the cure temperatures.

The adsorbent-accelerator composition must therefore possess two fundamental properties to be useful in this invention. The adsorbent must accept at least a portion of the accelerator molecule in the sorption area and the accelerator must be releasable in at least one active form at the curing temperatures of the neoprene rubber. Pyrocatechol on activated carbon is an example of a non-releasable accelerator that has been internally sorbed.

The constituents of the neoprene formulations used in the experiments recorded in Table A, above, are listed in Table II. The neoprene rubber used is designated "Type W" in the trade. The W Types of neoprene, which include W, WRT, and WHV, contain no sulfur, sulfur compounds or other compounds which could decompose to release free sulfur or form accelerators. The neoprene formulations of Table II are typical formulations used to define the cure and scorch characteristics of commercial accelerators. Many other compounding ingredients such as fillers of clay or other materials may be added to develop specific properties in the final product. The present invention is not limited to any particular member of the W class of neoprenes or to any particular formulation recipe, but is applicable to formulations containing any non-sulfur-modified (W Type) neoprene rubber and a wide variety of compounding ingredients.

*Table II*

TWO BASIC RECIPES FOR TYPE W NEOPRENE FORMULATIONS

| Recipe #1 | Recipe #2 | Amount Used, parts | Function |
| --- | --- | --- | --- |
| Neoprene Type W | Neoprene Type W. | 100 | Polymer. |
| Semi-Reinforcing Carbon Black (SRF). | Semi-Reinforcing Carbon Black (SRF). | 30 | Reinforcing agent. |
|  | Neozone A | 5 | Antioxidant. |
| Stearic Acid | Stearic Acid | 0.5 | Activator and softener. |
| Zinc Oxide | Zinc Oxide | 5.0 | Vulcanizing agent. |
| Magnesium Oxide | Magnesium Oxide | 2.0 | Do. |
| Accelerator | Accelerator | Variable | Shorten Cure Time. |

A typical experiment using basic recipe #1 neoprene formulation is described in Examples 1 and 2.

EXAMPLE I.—COMPOUNDING OF TYPE W NEOPRENE FORMULATION USING PYROCATECHOL CARRIED ON SILICA GEL AS ACCELERATOR

From a masterbatch consisting of 100 parts neoprene W and 30 parts of semi-reinforcing carbon black, 390 grams were blended on a 6-inch x 12-inch laboratory 2-roll mill. To this was added 15 grams of zinc oxide, 1.5 grams of stearic acid, 6.0 grams magnesium oxide and 4.0 grams of activated silica gel carrying pyrocatechol (14.9 wt. percent). The formulation was compounded according to the ASTM standard mixing procedure (reference ASTM Standards on Rubber Products D–15–55T).

After mixing, the sample was removed from the roll mill in a sheet and a sample cut for determination of Mooney scorch time at 250° F. Mooney scorch time at a given temperature is the number of minutes required to reach a 5-point increase in the viscosity of the sample above the minimum viscosity of that sample as determined in a Mooney shearing disk viscometer. This measurement was conducted according to ASTM Standards on Rubber Products D–927–55T.

The physical properties of the vulcanized product were obtained by curing 6-inch x 6-inch x 0.075-inch slabs of rubber in a standard 4-cavity test mold at 307° F. for measured periods of time. The tensile tests were conducted according to ASTM Standards on Rubber Products D–412–51T.

The Mooney scorch time for this formulation was 11.5 minutes. The physical properties of the cured samples after various periods of time at 307° F. are given below:

| Cure Time (min.) | Stress at 300% Elongation (p.s.i.) | Ultimate Tensile (p.s.i.) | Ultimate Elongation (percent) |
| --- | --- | --- | --- |
| 5 | 948 | 2,667 | 615 |
| 7 | 1,645 | 2,980 | 475 |
| 10 | 1,760 | 2,800 | 435 |

These data indicate a well-cured product was obtained in 5 minutes at 307° F. In the absence of an accelerator, very little cure was obtained even after 10 minutes at 307° F. Addition of pyrocatechol alone, while it produced a rapid cure, gave a Mooney scorch time of only 5.5 minutes.

EXAMPLE II.—COMPOUNDING OF TYPE W NEOPRENE FORMULATION USING PYROCATECHOL CARRIED ON AMORPHOUS METAL ALUMINUM SILICATE AS ACCELERATOR

From a masterbatch consisting of 100 parts neoprene W and 30 parts of semi-reinforcing carbon black, 390 grams were blended on a 6-inch x 12-inch laboratory 2-roll mill. To this were added 15 grams of zinc oxide, 1.5 grams of stearic acid, 6.0 grams of magnesium oxide and 3.9 grams of Zeolex-20 containing 15.0 wt.-percent pyrocatechol.

After compounding as in Example 1, the Mooney scorch for this formulation was measured and found to be 8 minutes at 250° F. The physical properties of the cured samples after various periods of time at 307° F. were as follows:

| Cure Time (min.) | Stress at 300% Elongation (p.s.i.) | Ultimate Tensile (p.s.i.) | Ultimate Elongation (percent) |
| --- | --- | --- | --- |
| 5 | 900 | 2,750 | 685 |
| 7 | 1,215 | 2,886 | 600 |

These data indicate a well-cured product in 5 minutes at 307° F.

A typical experiment using basic recipe #2 neoprene formulation is described in Examples 3 and 4.

EXAMPLE III.—COMPOUNDING OF TYPE W NEOPRENE FORMULATION USING NA–33 CARRIED ON SILICA GEL AS ACCELERATOR

A masterbatch (333 grams) containing 100 parts neoprene W, 30 parts semi-reinforcing carbon black, and 1.0 part Neozone A, antioxidant were banded on a two-roll mill. To this was added 15 grams zinc oxide, 1.5 grams stearic acid, 6.0 grams magnesium oxide and 12.0 grams silica gel containing 25.0 wt.-percent NA–33. The formulation was compounded according to the ASTM standard mixing procedure (reference ASTM Standards on Rubber Products D-15-55T).

After mixing, the sample was removed from the roll mill in a sheet and a sample cut for determination of Mooney scorch time at 250° F. Mooney scorch time at a given temperature is the number of minutes required to reach a 5-point increase in the viscosity of the sample above the minimum viscosity of that sample as determined in a Mooney shearing disk viscometer. This measurement was conducted according to ASTM Standards on Rubber Products D-927-55T.

The physical properties of the vulcanized product were obtained by curing 6-inch x 6-inch x 0.075-inch slabs of rubber in a standard 4-cavity test mold at 307° F. for measured periods of time. The tensile tests were conducted according to ASTM Standards on Rubber Products D-412-51T.

This recipe had a Mooney scorch time of 20 minutes. Samples cured for various periods of time at 307° F. had the following properties:

| Cure Time (min.) | Stress at 300% Elongation (p.s.i.) | Ultimate Tensile (p.s.i.) | Ultimate Elongation (percent) |
| --- | --- | --- | --- |
| 5 | 1,013 | 2,835 | 730 |
| 7 | 1,531 | 2,759 | 570 |
| 10 | 1,900 | 3,250 | 470 |

These data show that a well-cured product was obtained in 5 minutes. NA-33 alone scorch in 11 minutes.

EXAMPLE IV.—COMPOUNDING OF TYPE W NEOPRENE FORMULATION USING NA-33 CARRIED ON SILICA GEL

A masterbatch (333 grams) containing 100 parts neoprene W, 30 parts semi-reinforcing carbon black, and 1.0 part Neozone A antioxidant were banded on a two-roll mill. To this were added 15 grams zinc oxide, 1.5 grams stearic acid, 6.0 grams magnesium oxide, and 9.0 grams silica gel containing 15 wt.-percent of NA-33. The formulation was compounded according to the ASTM standard mixing procedure (reference: ASTM Standards on Rubber Products D-15-55T).

After mixing the sample was removed from the roll mill in a sheet and a sample cut for the determination of Mooney scorch time at 250° F. This measurement was conducted according to ASTM Standards on Rubber Products D-927-55T.

The physical properties of the vulcanized product were obtained by curing 6-inch x 6-inch x 0.075-inch rubber slabs in a standard four-cavity test mold at 307° F. for measured periods of time. The tensile tests were conducted according to ASTM Standards on Rubber Products D-412-51T.

This recipe had a Mooney scorch time of 21 minutes. Samples cured for various periods of time at 307° F. had the following properties:

| Cure Time (min.) | Stress at 300% Elongation (p.s.i.) | Ultimate Tensile Strength (p.s.i.) | Ultimate Elongation (percent) |
| --- | --- | --- | --- |
| 5 | 571 | 1,929 | 770 |
| 7 | 1,000 | 2,350 | 560 |
| 10 | 1,580 | 2,988 | 515 |

These data show that a well cured product was obtained in 7 minutes. NA-33 alone scorch in 11 minutes.

A typical method of loading accelerators on amorphous adsorbents is described in Example 5.

Table B

| Adsorbent | Accelerator | Wt-Percent Accelerator Loaded on Adsorbents | Accelerator on Adsorbent/ p.h.r. | Accelerator Loaded Adsorbent in recipe/p.h.r. | Mooney Scorch Time at 250° F. | Press Cure at 307° F. Stress at 300% Elongation (p.s.i.) | | |
| --- | --- | --- | --- | --- | --- | --- | --- | --- |
| | | | | | | 7 min. | 10 min. | 15 min. |
| Silica Gel | Pyrocatechol | 10 | 0.2 | 2.0 | 8 | 1,241 | 1,600 | 1,873 |
| Do | do | 15 | 0.2 | 1.3 | 7 | 1,400 | 1,679 | 1,795 |
| Activated Alumina | do | 5 | 0.2 | 4.0 | 8.5 | 716 | 1,060 | 1,383 |
| Do | do | 10 | 0.2 | 2.0 | 6 | 1,013 | 1,220 | 1,415 |
| Do | do | 15 | 0.2 | 1.3 | 5.5 | 1,205 | 1,503 | 1,574 |
| Activated Carbon | do | 5 | 0.2 | 4.0 | 30 | (1) | (1) | 1,100 |
| Do | do | 10 | 0.2 | 2.0 | 14 | (1) | (1) | 1,053 |
| Do | do | 15 | 0.2 | 1.3 | 6 | 1,143 | 1,275 | 1,358 |

1 No cure.

EXAMPLE V.—SORPTION OF PYROCATECHOL ON SILICA GEL

In a vacuum desiccator there were placed 100 grams activated silica gel and 18 grams of pyrocatechol. The desiccator was evacuated, sealed and placed in an oven at 100° C. for a period of 24 hours. During this period the silica gel increased in weight by 17.5 grams, indicating that this quantity of pyrocatechol was sorbed. The resulting product was a free-flowing white powder containing 14.9 wt.-percent pyrocatechol.

Table B shows the effects of varying amounts of amorphous adsorbent and accelerator in the rubber formulation. It has been discovered that when the preferred amorphous adsorbent, silica gel, is loaded with pyrocatechol the preferred accelerator loaded on adsorbent wt.-percent is from about 5 to 15 wt.-percent. The preferred wt.-percent accelerator loaded on adsorbent for NA-33 and diethylthiourea on silica gel is from about 5 to about 35 wt.-percent. The preferred amount of accelerator loaded on adsorbent per hundred parts rubber for pyrocatechol, NA-33 and diethylthiourea when loaded on silica gel has been discovered to be from about 1.0 p.h.r. to about 4.0 p.h.r.

It has been determined that when an amorphous adsorbent which has been previously loaded with a curing accelerator is heated between about 75° C. and 150° C. for several hours, scorch time and cure rate characteristics vary over those obtained in the absence of this preheating step. Table C, below, shows that after heating 2 hours at 100° C., silica gel, activated carbon and activated alumina showed varying degrees of improvement in processing safety (longer scorch time) and also rapid rates of cure. The degree of improvement achieved by this heat treatment was greatest for adsorbents which were previously found to be of near marginal utility, namely, activated carbon, activated alumina, and amorphous aluminosilicates. A smaller margin of advantage was found for the preferred adsorbent, silica gel.

Table C
EFFECT OF HEATING ACCELERATORS COMBINED WITH ADSORBENTS BEFORE INCORPORATING INTO TYPE W NEOPRENE FORMULATIONS

| Adsorbent | Accelerator | P.h.r. Accelerator in Recipe | P.h.r. Loaded Adsorbent in Recipe | Time Accelerator-Adsorbent Comb. Heated at 100° C. Hr. | Mooney Scorch Time at 250° F. (min. to 5 pt. rise) | Press Cure at 307 F. Stress at 300% Elongation | | |
|---|---|---|---|---|---|---|---|---|
| | | | | | | 5 min. | 10 min. | 15 min. |
| None | NA-33 | 1.0 | | 0 | 11 | 1,762 | 1,976 | 2,136 |
| Do | NA-33 | 1.0 | | 2 | 11 | 1,788 | 2,123 | 2,150 |
| Silica Gel | NA-33 | 1.0 | 4.0 | 0 | 20 | 1,013 | 1,531 | 1,900 |
| Do | NA-33 | 1.0 | 4.0 | 2 | 21 | 1,524 | 2,002 | 2,140 |
| Activated Carbon | NA-33 | 1.0 | 4.0 | 0 | 10.5 | 1,714 | 2,048 | 2,049 |
| Do | NA-33 | 1.0 | 4.0 | 2 | 15.5 | 1,235 | 1,679 | 1,854 |
| Activated Alumina | NA-33 | 1.0 | 4.0 | 0 | 12 | 1,616 | 1,952 | 2,123 |
| Do | NA-33 | 1.0 | 4.0 | 2 | 17 | 1,060 | 1,367 | 1,542 |
| Zeolex-20 | NA-33 | 1.0 | 4.0 | 0 | 14 | 1,882 | 2,000 | 2,120 |
| Do | NA-33 | 1.0 | 4.0 | 2 | 11.5 | 2,000 | 2,075 | 2,265 |

Table D, below, shows that this invention is limited to having the adsorbent pre-loaded with the accelerator before combining it with the neoprene rubber formulation. No improvement or advantage in Mooney scorch time is accomplished by adding the adsorbent and accelerator separately to a neoprene rubber formulation.

Table D
EFFECT OF ADDING VARIOUS ADSORBENTS TO NEOPRENE W FORMULATIONS CONTAINING 0.3 P.H.R.*-PYROCATECHOL VS. ACCELERATOR

[Effective adsorbent concentrations=9.1 wt. percent]

| Compound | P.h.r. | | | | |
|---|---|---|---|---|---|
| Neoprene W | 100 | 100 | 100 | 100 | 100 |
| SRF Black | 30 | 30 | 30 | 30 | 30 |
| Stearic Acid | 0.5 | 0.5 | 0.5 | 0.5 | 0.5 |
| Zinc Oxide | 5.0 | 5.0 | 5.0 | 5.0 | 5.0 |
| Magnesium Oxide | 2.0 | 2.0 | 2.0 | 2.0 | 2.0 |
| Pyrocatechol | 0.3 | 0.3 | 0.3 | 0.3 | 0.3 |
| Silica Gel | | 3.0 | | | |
| Activated Alumina | | | 3.0 | | |
| Activated Carbon | | | | 3.0 | |
| Zeolex-20 | | | | | 3.0 |

MOONEY SCORCH (MS) MINUTES TO 5-POINT RISE

| 250° F | 4.5 | 5.5 | 4.5 | 5 | 3.5 |
|---|---|---|---|---|---|

STRESS AT 300% ELONGATION, P.S.I.

| Minutes at 307° F.: | | | | | |
|---|---|---|---|---|---|
| 5 | 1,785 | 1,400 | 1,526 | 1,150 | 1,404 |
| 7 | 1,740 | 1,850 | 1,790 | 1,390 | 1,902 |
| 10 | 1,783 | 2,027 | 1,855 | 1,700 | 2,082 |

ULTIMATE TENSILE, P.S.I.

| Minutes at 307° F.: | | | | | |
|---|---|---|---|---|---|
| 5 | 3,360 | 3,143 | 2,737 | 2,250 | 3,191 |
| 7 | 3,136 | 3,250 | 2,744 | 2,365 | 3,171 |
| 10 | 3,250 | 3,147 | 2,750 | 2,568 | 3,325 |

ULTIMATE ELONGATION, PERCENT

| Minutes at 307° F.: | | | | | |
|---|---|---|---|---|---|
| 5 | 515 | 580 | 455 | 540 | 580 |
| 7 | 490 | 530 | 450 | 470 | 500 |
| 10 | 480 | 430 | 425 | 430 | 470 |

*Parts per hundred parts of rubber.

Although preferred embodiments of this invention have been described in detail, it is contemplated that modifications of the process may be made and that some features may be employed without others, all within the spirit and scope of the invention.

What is claimed is:

1. A method for the rapid curing of a non-sulfur-modified chloroprene polymer rubber which comprises providing a curable non-sulfur-modified chloroprene polymer rubber formulation; incorporating therein an activated amorphous adsorbent containing in the adsorbed state a curing accelerator, said adsorbent having pores of large enough cross-sectional dimensions to accept at least a portion of said curing accelerator molecule into the sorption area; processing said chloroprene polymer formulation at temperatures below the curing temperatures of said chloroprene polymer formulation; heating said processed chloroprene polymer formulation to temperatures up to the curing temperatures of said chloroprene polymer formulation whereby said curing accelerator is released from said adsorbent, said curing accelerator being releasable in at least one active form from said adsorbent by heating said chloroprene polymer formulation to said curing temperatures, the rate of curing of said chloroprene polymer formulation being increased, thereby.

2. A method for the rapid curing of non-sulfur-modified chloroprene polymer rubber which comprises providing a curable non-sulfur-modified chloroprene polymer rubber formulation; incorporating therein an activated amorphous adsorbent containing in the adsorbed state a curing accelerator, said adsorbent having pores of large enough cross-sectional dimensions to accept at least a portion of said curing accelerator molecule into the sorption area; processing said chloroprene polymer formulations below a temperature of about 280° F.; heating said processed chloroprene polymer formulation to the temperature range of about 280° F. to about 400° F. whereby said curing accelerator is released from said adsorbent, said curing accelerator being releasable in at least one active form from said adsorbent by heating said chloroprene polymer formulation within the temperature range of about 280° F. to about 400° F., the rate of curing of said chloroprene polymer formulation being increased thereby.

3. A process as set forth in claim 1 wherein the adsorbent is silica gel.

4. A process as set forth in claim 1 wherein the adsorbent is activated alumina.

5. A process as set forth in claim 1 wherein the adsorbent is activated carbon.

6. A process as set forth in claim 1 wherein the adsorbent is an amorphous metal aluminum silicate.

7. A process as set forth in claim 1 wherein the accelerator is pyrocatechol.

8. A process as set forth in claim 1 wheerin the accelerator is diethylthiourea.

9. A process as set forth in claim 1 wherein the accelerator is a thioamide containing compound.

10. In a method for the rapid curing of a non-sulfur-modified chloroprene copolymer rubber formulation wherein said chloroprene polymer formulation includes an activated amorphous adsorbent containing in the adsorbed state a curing accelerator, said adsorbent having pores of large enough cross-sectional dimensions to accept at least a portion of said accelerator molecule into the sorption area, and wherein the processing variables of scorch time and cure rate must be controlled, the steps of (1) adjusting the percentage of accelerator loaded on the adsorbent to provide a predetermined scorch time, (2) adjusting the amount of accelerator-containing adsorbent in said formulation to provide a predetermined rate of cure, (3) processing said formulation at temperatures essentially below the curing temperature of said formulation, and (4) releasing said curing accelerator from said adsorbent by heating said processed formulation up to said curing temperature, said accelerator being releasable from said adsorbent in at least one active form by heating said formulation to temperatures up to said curing temperatures.

11. In a method for the rapid curing of a non-sulfur-modified chloroprene polymer rubber formulation wherein said chloroprene polymer formulation includes an activated amorphous adsorbent containing in the adsorbed state a curing accelerator, said adsorbent having pores of large enough cross-sectional dimensions to accept at least a portion of said accelerator molecule into the sorption area, and wherein the processing variables of scorch time and cure rate must be controlled, the steps of, (1) adjusting the percentage of accelerator loaded on the adsorbent to provide a predetermined scorch time, (2) adjusting the amount of accelerator-containing adsorbent in said formulation to provide a predetermined rate of cure, (3) processing said formulation at temperatures below a temperature of about 280° F., and (4) releasing said curing accelerator from said adsorbent by heating said processed formulation within the temperature range of about 280° F. to about 400° F., said curing accelerator being releasable from said adsorbent in at least one active form by heating said formulation within the temperature range of about 280° F. to about 400° F.

12. The steps as set forth in claim 10 wherein the activated amorphous adsorbent is silica gel, the curing accelerator is pyrocatechol, the preferred accelerator loaded on adsorbent percentage range is from about 5 wt.-percent to about 15 wt.-percent, and the preferred range amount of accelerator containing adsorbent is from about 1.0 phr. to about 4.0 phr.

13. The steps as set forth in claim 10 wherein the activated amorphous adsorbent is silica gel, the curing accelerator is a thioamide containing compound, the preferred accelerator loaded on adsorbent percentage range is from about 5 wt.-percent to about 35 wt.-percent, and the preferred range amount of accelerator-containing adsorbent from about 1.0 phr. to about 4.0 phr.

14. The steps as set forth in claim 10 wherein the activated amorphous adsorbent is silica gel, the curing accelerator is diethylthiourea, the preferred accelerator loaded on adsorbent percentage range is from about 5 wt.-percent to about 35 wt.-percent, and the preferred range amount of accelerator-containing adsorbent is from about 1.0 phr. to about 4.0 phr.

15. A method for the rapid curing of a non-sulfur-modified chloroprene polymer rubber which comprises providing a curable non-sulfur-modified chloroprene polymer rubber formulation; heating an activated amorphous adsorbent containing in the sorbed state a curing accelerator at temperatures below the degradation temperatures of the adsorbent and the accelerator, said adsorbent having pores of large enough cross-sectional dimensions to accept at least a portion of said curing accelerator molecule into the sorption area; incorporating said heated amorphous adsorbent within said chloroprene polymer formulation; processing said chloroprene polymer formulation at temperatures below the curing temperatures of said chloroprene polymer formulation; heating said processed chloroprene polymer formulation to temperatures up to the curing temperatures of said chloroprene polymer formulation whereby said curing accelerator is released from said adsorbent by heating said chloroprene polymer formulation to said curing temperatures, the rate of curing of said chloroprene polymer formulation being increased thereby.

16. A method as set forth in claim 15 wherein said adsorbent containing said accelerator is heated at about 100° C. for about 2 hours.

17. A method as set forth in claim 15 wherein said adsorbent containing said accelerator is heated between the temperature range of about 75° C. to about 150° C.

18. In a method for the rapid curing of a non-sulfur-modified chloroprene polymer rubber formulation wherein said chloroprene polymer formulation includes an activated amorphous adsorbent containing the adsorbed state a curing accelerator, said adsorbent having pores of large enough cross-sectional dimensions to accept at least a portion of accelerator molecule into the sorption area, and wherein the processing variables of scorch time and cure rate must be controlled, the steps of (1) heating said adsorbent containing said curing accelerator before including said adsorbent within said chloroprene polymer formulation, (2) adjusting the length of said heating to provide a predetermined scorch time and cure rate, (3) processing said chloroprene polymer formulation at temperatures below the curing temperature of said formulation, and (4) and releasing said curing accelerator from said adsorbent by heating said processed chloroprene polymer formulation up to said curing temperatures, said accelerator being releasable in at least once active form from said adsorbent by heating said chloroprene polymer formulation to temperatures up to said curing temperature.

References Cited by the Examiner

UNITED STATES PATENTS

| | | | |
|---|---|---|---|
| 2,929,805 | 3/1960 | Tann | 260—79.5 |
| 3,033,800 | 5/1962 | Elliott et al. | 252—455 |
| 3,036,983 | 5/1962 | O'Connor | 260—92.3 |
| 3,091,550 | 5/1963 | Doying | 252—444 |
| 3,098,032 | 7/1963 | Gladrow et al. | 252—455 |

FOREIGN PATENTS

| | | |
|---|---|---|
| 563,517 | 1/1958 | Belgium. |
| 563,518 | 1/1958 | Belgium. |
| 577,697 | 4/1959 | Belgium. |

LEON J. BERCOVITZ, *Primary Examiner.*

MILTON STERMAN, HAROLD N. BURSTEIN, DONALD E. CZAJA, *Examiners.*